(12) United States Patent
Kobayashi et al.

(10) Patent No.: US 7,481,587 B2
(45) Date of Patent: Jan. 27, 2009

(54) OPTICAL ELEMENT, MOLD FOR THE OPTICAL ELEMENT, METHOD FOR MANUFACTURING THE OPTICAL ELEMENT AND BIDIRECTIONAL OPTICAL COMMUNICATION MODULE

(75) Inventors: Hajime Kobayashi, Tokyo (JP); Yayoi Eguro, Hachioji (JP); Nobuyoshi Mori, Hachioji (JP); Hiroyuki Hattori, Hachioji (JP); Yoshiharu Masaki, Kodaira (JP); Fumiaki Yoshida, Tama (JP); Yuichi Atarashi, Hachioji (JP); Kazuhiro Wada, Hachioji (JP); Kazuhiko Ishikawa, Kofu (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/723,871

(22) Filed: Mar. 22, 2007

(65) Prior Publication Data

US 2007/0237458 A1  Oct. 11, 2007

(30) Foreign Application Priority Data

Mar. 27, 2006 (JP) .............................. 2006-084966

(51) Int. Cl.
  *G02B 6/36* (2006.01)
(52) U.S. Cl. ............................ 385/89; 385/37; 370/464
(58) Field of Classification Search ................... 385/37, 385/89, 93; 370/464
See application file for complete search history.

(56) References Cited

U.S. PATENT DOCUMENTS

| | | | | |
|---|---|---|---|---|
| 5,473,471 A | * | 12/1995 | Yamagata et al. | 359/569 |
| 5,555,334 A | * | 9/1996 | Ohnishi et al. | 385/93 |
| 5,760,871 A | * | 6/1998 | Kosoburd et al. | 623/6.3 |
| 6,120,191 A | * | 9/2000 | Asakura et al. | 385/93 |
| 6,504,975 B1 | * | 1/2003 | Yamagata et al. | 385/33 |
| 6,650,477 B2 | * | 11/2003 | Nakai | 359/569 |
| 7,121,741 B2 | * | 10/2006 | Furuta et al. | 385/89 |
| 2003/0197906 A1 | * | 10/2003 | Furuta et al. | 359/15 |
| 2004/0212859 A1 | * | 10/2004 | Tsukagoshi | 359/15 |
| 2006/0001972 A1 | * | 1/2006 | Sato et al. | 359/569 |
| 2006/0204185 A1 | * | 9/2006 | Ozeki | 385/92 |

FOREIGN PATENT DOCUMENTS

JP  10312566 A  * 11/1998

* cited by examiner

*Primary Examiner*—Ellen Kim
(74) *Attorney, Agent, or Firm*—Finnegan, Henderson, Farabow, Garrett & Dunner, L.L.P.

(57) ABSTRACT

An optical element used in a bidirectional optical communication module used for bidirectional optical fiber communication by a wavelength multiplex system, comprising a diffraction grating of binary structure prepared by molding, wherein a taper is formed at a portion of the diffraction grating where light entering the diffraction grating is intercepted by a convex part of the binary structure of the diffraction grating.

6 Claims, 5 Drawing Sheets

ENLARGE VIEW OF SECTION A

ENLARGE VIEW OF SECTION B

ENLARGE VIEW OF SECTION C

OPTICAL ELEMENT, MOLD FOR THE OPTICAL ELEMENT, METHOD FOR MANUFACTURING THE OPTICAL ELEMENT AND BIDIRECTIONAL OPTICAL COMMUNICATION MODULE

This application is based on Japanese Patent Application No. 2006-84966 filed on Mar. 27, 2006, in Japanese Patent Office, the entire content of which is hereby incorporated by reference.

BACKGROUND OF THE INVENTION

The present invention relates to an optical element incorporated in a bidirectional optical communication module used for transmitting and receiving terminals of bidirectional optical fiber communication of a wavelength multiplex system.

In recent years, an optical communication system using an optical fiber as a communication medium such as a high-speed Internet and an IP telephone has been widespread. This optical communication system transmits simultaneously a plurality of optical signals in different wavelengths through an optical fiber by a WDM (Wavelength Division Multiplex System) and for transmitting and receiving terminals of optical signals, a bidirectional optical communication module is used.

Such a bidirectional optical communication module is well-known, for example, by Patent Document 1 indicated below. The bidirectional optical communication module described in Patent Document 1, as shown in FIG. 5, stores a light emitting element 100 and a light receiving element 700 in a package 120 and has a holographic diffraction grating 600 installed on the top or bottom of a cover glass 220 arranged at the package opening.

In the bidirectional optical communication module, at time of transmission, a light beam emitted from the light emitting element 100 transmits through the diffraction grating 600 and a 0-degree diffracted light beam is focused by a lens 300 on a surface 500 at the end of an optical fiber 400. At time of reception, a light beam emitted from the surface 500 at the end of the optical fiber 400 reaches the diffraction grating 600 via the lens 300 and is diffracted by the diffraction grating 600, and a + primary diffracted light is focused on the light detection surface of the light receiving element 700, and a transmission signal transmitted by the optical fiber 400 is received.

The diffraction grating 600, as shown in FIG. 6, is composed of a diffraction grating of a binary structure having linear grating slits 200 formed on the cover glass 220 (refractive index n).

Patent Document 1: U.S. Pat. No. 5,555,334

The diffraction grating used as an optical element of the bidirectional optical communication module (hereinafter, may be referred to as just the diffraction grating) has a fine structure, though to prevent the diffraction efficiency from lowering and maintain the transmission factor high, it is required to prepare a highly precise grating structure. On the other hand, the diffraction grating, to produce in large quantities at a low price, is generally prepared by molding using a mold tool.

However, when preparing a diffraction grating by molding using a mold tool, since the grating structure is fine, there is a disadvantage that at time of mold release after molding, it is easily deformed. When the grating structure is deformed, the diffraction efficiency is lowered and the transmission factor is lowered.

SUMMARY OF THE INVENTION

The present invention, with the foregoing problem in view, is intended to obtain at a low cost an optical element for a bidirectional optical communication module having a highly precise grating structure which is not deformed at time of mold release and a low-priced bidirectional optical communication module maintaining a high transmission factor.

The above object is accomplished by the invention described below.

1. An optical element used in a bidirectional optical communication module used for bidirectional optical fiber communication by a wavelength multiplex system, comprising a diffraction grating of binary structure prepared by molding, wherein a taper is formed at a portion of the diffraction grating where light entering the diffraction grating is intercepted by a convex part of the binary structure of the diffraction grating.

2. The optical element of Item 1, wherein the taper formed at the portion the diffractive grating is a draft taper.

3. The optical element of Item 1, wherein an angle of the draft taper is changed according to an incident angle of the light entering the diffraction grating.

4. A bidirectional optical communication module comprising: a light emitting element which transmits an optical signal to an end face of an optical fiber; a light receiving element which receives an optical signal from the end face of the optical fiber; and the optical element of Item 1, wherein the diffraction grating of the optical element is formed on the surface of the optical element opposite to the end of the optical fiber.

5. A mold for the optical element of Item 1, comprising plurality of projections for the diffraction grating.

6. A method of manufacturing the optical element, comprising steps of; introducing an optical material into the mold of Item 5; and releasing the molded optical material from the mold.

According to the present invention, an optical element for a bidirectional optical communication module having a highly-precise grating structure can be obtained at a low cost, thus a low-priced bidirectional optical communication module maintaining a high transmission factor can be obtained.

DETAILED DESCRIPTION OF THE PREFERRED EMBODIMENT

Hereinafter, the present invention will be explained in detail with reference to the embodiment, though the present invention is not limited to it.

Figure 1:
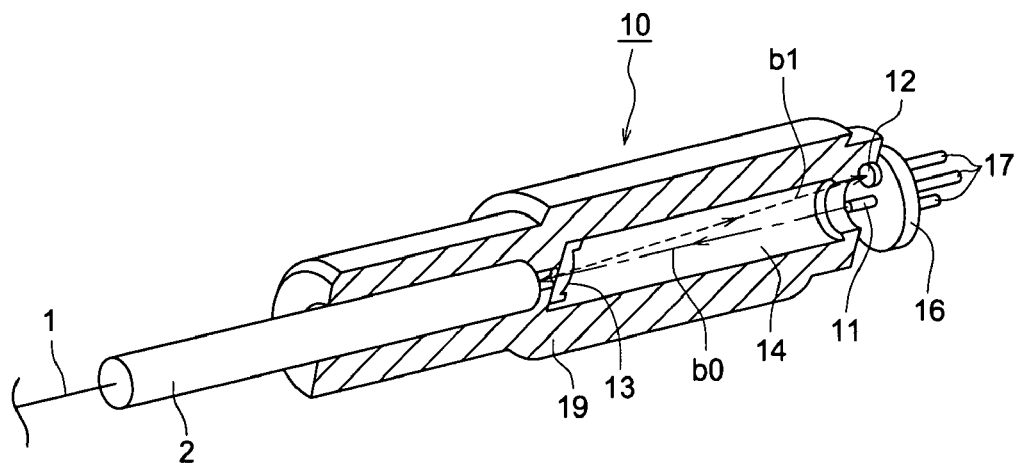
FIG. 1 is a perspective view showing the inside of the bidirectional optical communication module according to an embodiment of the invention that is halved.

FIG. 1 is a perspective view showing the inside of the bidirectional optical communication module according to an embodiment of the invention that is halved.

Figure 2:
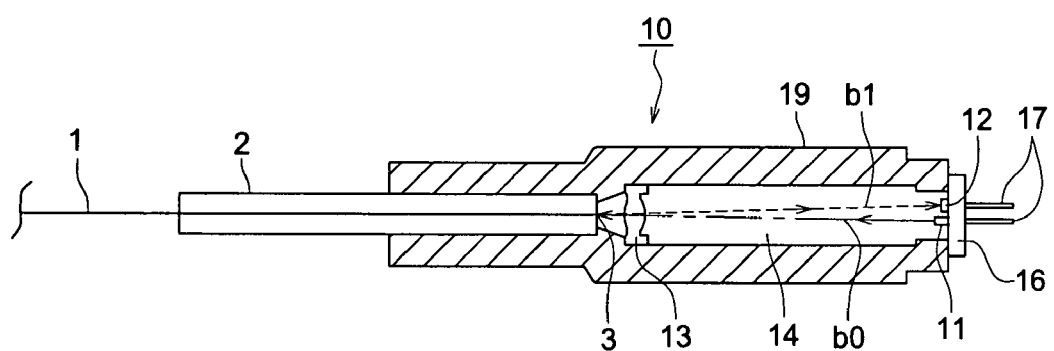
FIG. 2 is a schematic cross sectional view of the bidirectional optical communication module according to the embodiment.

FIG. 2 is a schematic cross sectional view of the bidirectional optical communication module according to the embodiment.

As shown in FIG. 1 and FIG. 2, a bidirectional optical communication module 10 includes a light emitting element 11, a light receiving element 12, and an optical element 13 inside an almost cylindrical frame 19. For example, for the light emitting element 11, a laser diode (LD) is used and for the light receiving element 12, a photodiode (PD) is used. The light emitting element 11 and light receiving element 12 are installed on a common substrate 16 and the substrate 16 is fixed to the frame.

The light emitting element 11 and light receiving element 12 are electrically connected to a plurality of connection pins 17 projected out from the substrate 16. Using the connection pins 17, the light emitting element 11 and light receiving element 12 are driven and output of the light emitting element 12 is sent to a device not drawn. Further, it is possible to install the light emitting element 11 and light receiving element 12 on different substrates and fix the substrates to the frame.

Further, a fiber holder 2 for supporting an optical fiber 1 is inserted and fixed in the frame 19 and a surface 3 at the end of the optical fiber 1 is exposed in a hollow 14 formed inside the frame 19. The optical fiber 1, for bidirectional optical fiber communication by the wavelength multiplex system, is connected to an optical transmission line such as an external optical fiber.

As shown in FIG. 1 and FIG. 2, the optical element 13 for leading light from the light emitting element to the optical fiber and leading light from the optical fiber to the light receiving element is arranged between the surface 3 at the end of the optical fiber 1 and the light emitting element 11 and light receiving element 12 in the frame 19. With respect to the optical element 13, on the surface opposite to the surface 3 at the end of the optical fiber 1, the diffraction grating of a binary structure is formed and on the surface opposite to the light emitting element 11 and light receiving element 12, a lens surface of an aspherical surface is formed.

Further, the wavelength of a light beam emitted from the light emitting element 11 for transmission is, for example, 1.3 μm, and the wavelength of a light beam which is transmitted from an external optical transmission line and is received by the light receiving element 12 is, for example, 1.5 μm, and these lights are different in the wavelength.

Figure 3:
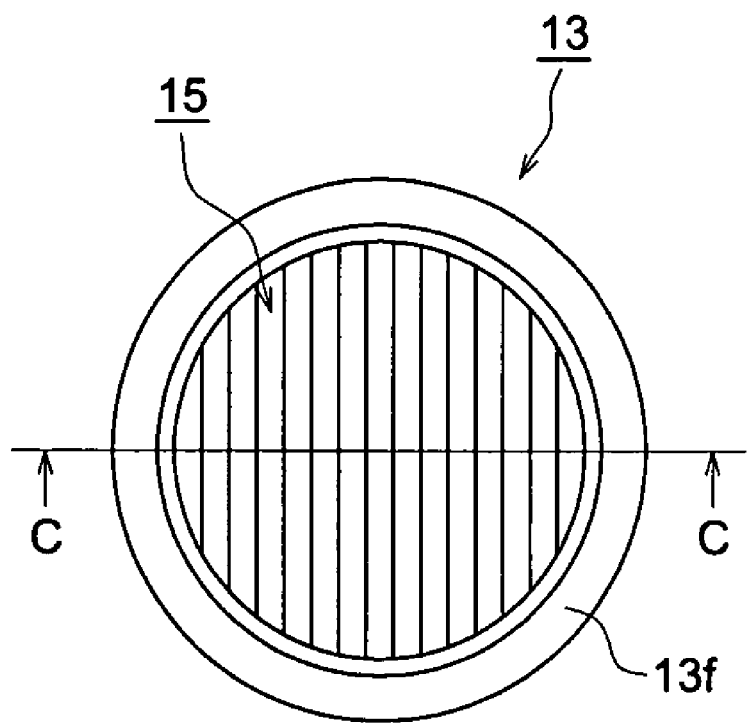
FIG. 3 is a schematic view showing the surface of the optical element where the diffraction grating is formed.
Figure 3:
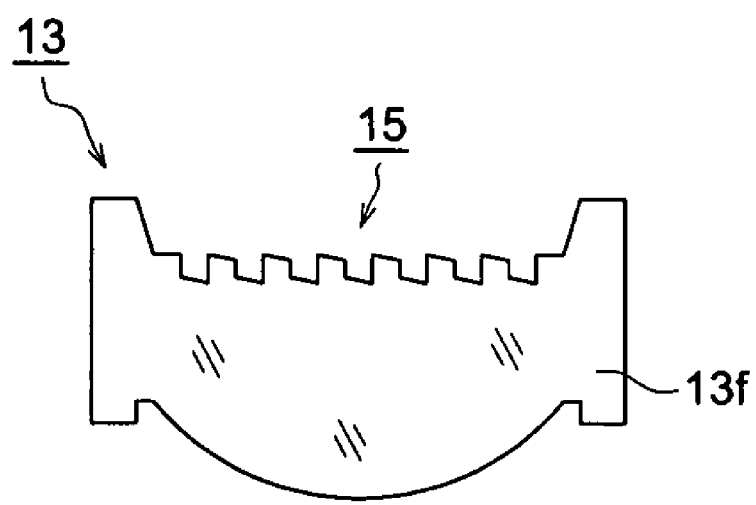

FIG. 3 is a schematic view showing the surface of the optical element 13 where the diffraction grating is formed. FIG. 3(a) is a plan view of the optical element 13 viewed from the side of the surface 3 at the end of the optical fiber 1 and FIG. 3(b) is a drawing showing a schematic section cut at the line C-C shown in FIG. 3(a).

As shown in FIG. 3(a), on the optical effective surface of the optical element 13 on the side of the optical fiber 1, a diffraction grating 15 is formed, and as shown in FIG. 3(b), the section of the diffraction grating 15 is formed in a binary structure in which a convex-concave pattern is formed repeatedly, and on the other surface, the lens surface of an aspherical surface is formed. Further, numeral 13f indicates a flange portion of the optical element 13.

The optical element 13 is incorporated into the frame 19 so that the line connecting the light emitting element 11 and light receiving element 12 shown in FIG. 2 almost coincides with the direction of the line C-C shown in FIG. 3(a) and is adjusted and fixed so that the light receiving amount of the light receiving element 12 becomes almost a maximum value.

Figure 4:
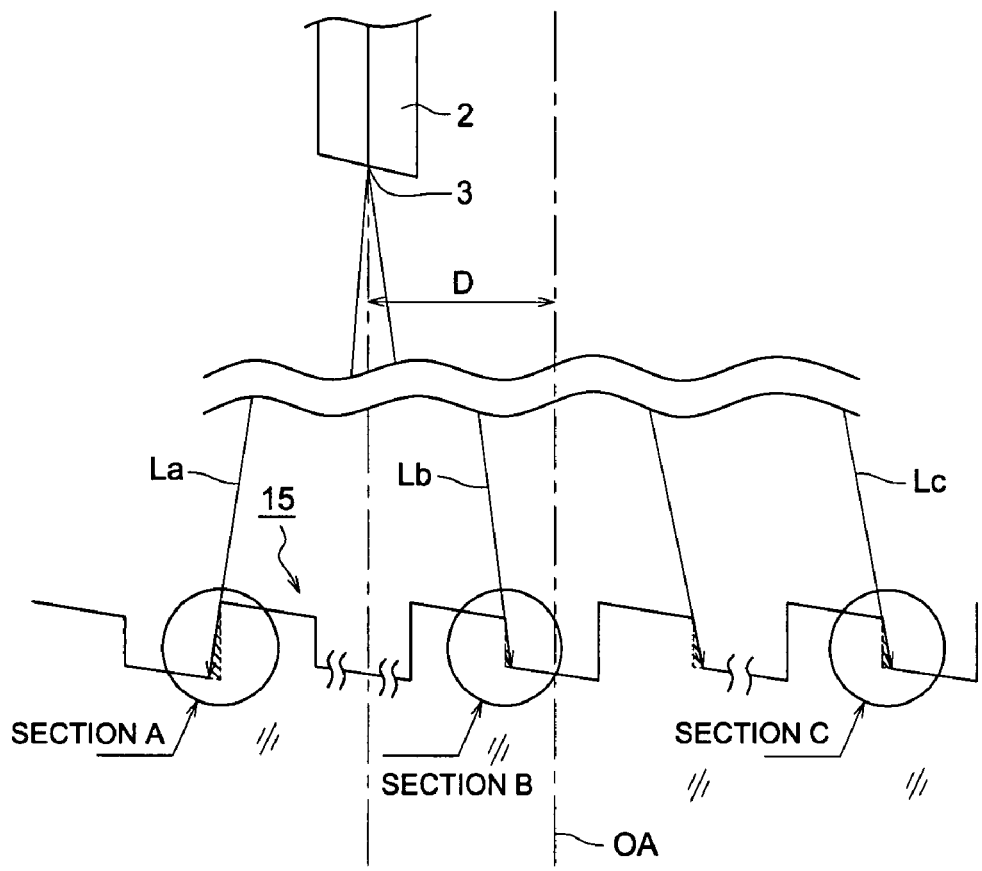
FIG. 4 is an enlarged view showing the section of the diffraction grating formed on the optical element according to the embodiment.
Figure 4:
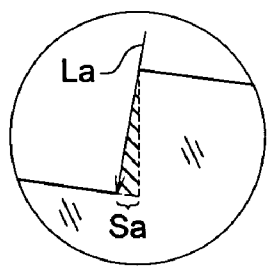
Figure 4:
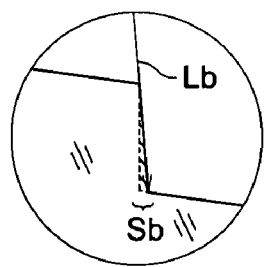
Figure 4:
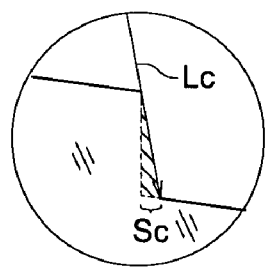
Figure 5:
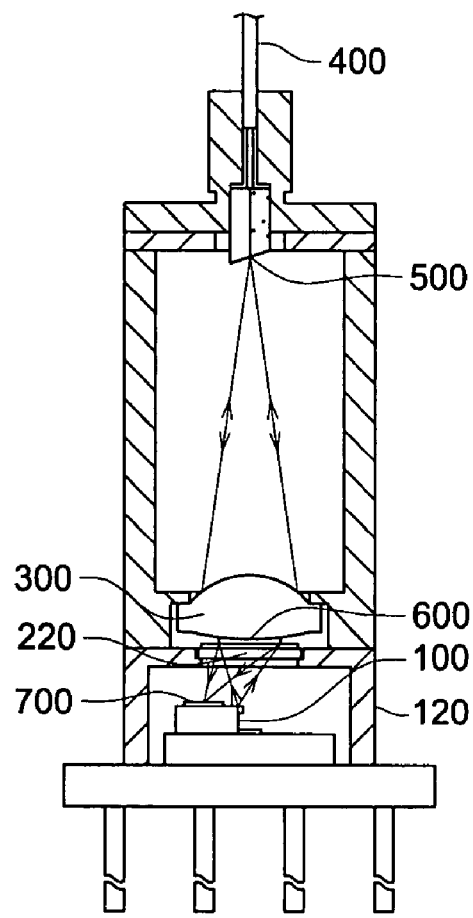
FIG. 5 is a cross sectional view of the essential section showing an example of the conventional bidirectional optical communication module.
Figure 6:
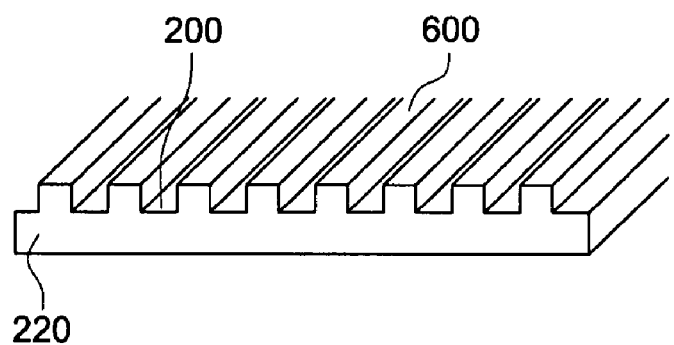
FIG. 6 is a perspective view of the diffraction grating having the conventional binary structure.

FIG. 4 is an enlarged view showing the section of the diffraction grating formed on the optical element 13 according to this embodiment. The drawing shows the section of the diffraction grating 15 shown in FIG. 3(b) which is enlarged.

In the drawing, the optical axis of the lens surface formed on the optical element 13 is indicated by OA, and the surface 3 at the end of the optical fiber 1 supported by the fiber holder 2 is arranged inside the optical effective surface at a distance of D in the direction perpendicular to the optical axis OA of the lens surface and the grating stripes of the diffraction grating 15. The sectional shape of the diffraction grating 15 in the case of such arrangement will be explained hereunder.

As shown in the drawing, in the grating stripe at the position at a distance of more than D from the optical axis OA on the left side of the drawing, as shown in the enlarged view of the section A, a light beam La emitted from the surface 3 at the end of the optical fiber 1 enters obliquely the grating stripe. Therefore, the light beam La is intercepted by the corner of the convex part of the grating stripe and an area Sa becomes a shadow. The area Sa is an area of the optical surface not used for bidirectional optical communication. Using the area Sa, the draft taper as shown by the shaded part is formed. This draft taper is preferably formed at the same angle as the incident angle of the light beam La or at a smaller angle than the incident angle of the light beam La.

Further, in the area between the optical axis OA and the surface 3 at the end of the optical fiber 1, as shown in the enlarged view of the section B, the light beam La emitted from the surface 3 at the end of the optical fiber 1 enters the grating stripe at a comparatively small incident angle. Also in this area, using an area Sb of a shadow, the draft taper as shown by the shaded part is formed. This draft taper is preferably formed at the same angle as the incident angle of a light beam Lb or at a smaller angle than the incident angle of the light beam Lb.

Furthermore, in the grating stripe at the position greatly apart from the optical axis OA on the right side of the drawing, as shown in the enlarged view of the section C, a light beam Lc emitted from the surface 3 at the end of the optical fiber 1 enters the grating stripe at a comparatively small incident angle. Using the area Sc, the draft taper as shown by the shaded part is formed. This draft taper is preferably formed at the same angle as the incident angle of the light beam Lc or at a smaller angle than the incident angle of the light beam Lc.

Namely, the angle of draft taper of the diffraction grating formed on the optical element according to this embodiment is gradually changed and formed according to the incident angle of the light entering the respective grating stripes.

When forming the diffraction grating of the binary structure by molding like this, at the portion where the light entering the diffraction grating is intercepted by the diffraction grating, the draft taper is formed, thus an optical element for a bidirectional optical communication module having a highly precise grating structure which is not deformed at the time of mold release can be obtained. As the draft taper is formed at the portion where the light entering the diffraction grating is intercepted, it is possible to prevent deformation of the optical element at the time of mold release without lowering the diffraction efficiency.

Further, the angle of draft taper is preferably changed slowly according to the incident angle of light entering each diffraction grating of the diffraction grating and for the grating stripe at a portion at a large incident angle, a draft taper at a large angle can be formed, thus an optical element for a bidirectional optical communication module having a highly precise grating structure which is more satisfactory in mold release can be obtained.

Figure 7:
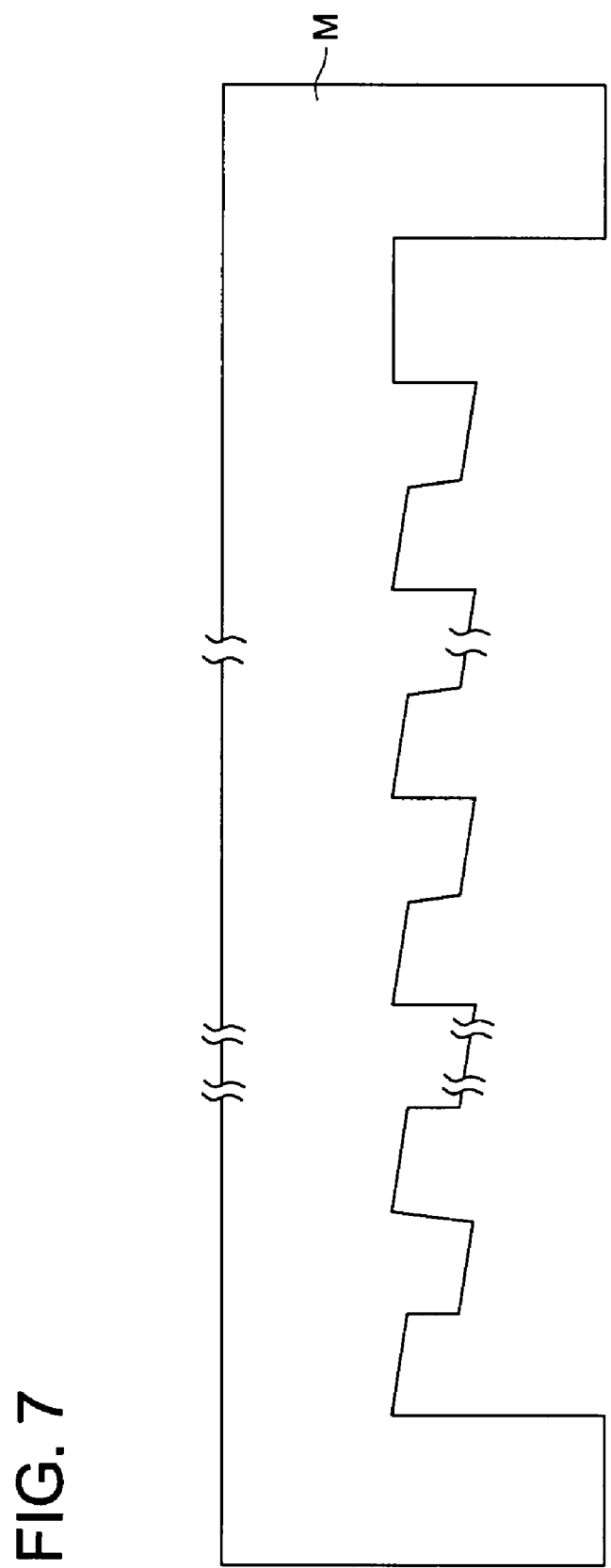
FIG. 7 is a cross sectional view of a mold for molding an optical element according to the embodiment.

FIG. 7 is a cross sectional view of a mold M for molding an optical element according to the embodiment. The mold M comprises surfaces oblique to the optical axis OA to form draft tapers corresponding to the parts shown in FIG. 4 as shaded parts.

Further, as mentioned above, when the surface at the end of the optical fiber which is a light emission section is installed inside the optical effective surface of the optical element and is shifted from the optical axis OA of the lens surface, as shown in FIG. 4, depending on the portion, the area where a draft taper is formed on the right side of the grating stripe shown in the drawing and the area where a draft taper is formed on the left side shown in the drawing coexist. When the surface at the end of the optical fiber which is a light emission section is installed outside the optical effective surface, a draft taper is formed on one side of the grating stripe.

Further, in the above explanation, the example that the angle of draft taper is formed by changing continuously is used, though it is possible to set the angle in each area and change it stepwise or form it at a fixed value.

Further, in this embodiment, the optical element that the diffraction grating is formed on one surface and the lens surface is formed on the other surface is explained, though the present invention is not limited to it and a bidirectional optical communication module in which the diffraction grating and lens are formed by separate members is also available.

What is claimed is:

1. An optical element used in a bidirectional optical communication module used for bidirectional optical fiber communication by a wavelength multiplex system, comprising a diffraction grating of binary structure prepared by molding, wherein a taper is formed at a portion of the diffraction grating where light entering the diffraction grating is intercepted by a convex part of the binary structure of the diffraction grating.

2. The optical element of claim 1, wherein the taper formed at the portion the diffractive grating is a draft taper.

3. The optical element of claim 1, wherein an angle of the draft taper is changed according to an incident angle of the light entering the diffraction grating.

4. A bidirectional optical communication module comprising:
   a light emitting element which transmits an optical signal to an end face of an optical fiber;
   a light receiving element which receives an optical signal from the end face of the optical fiber; and
   the optical element of claim 1,
   wherein the diffraction grating of the optical element is formed on the surface of the optical element opposite to the end of the optical fiber.

5. A mold for the optical element of claim 1, comprising plurality of projections for the diffraction grating.

6. A method of manufacturing the optical element, comprising steps of:
   introducing an optical material into the mold of claim 5; and
   releasing the molded optical material from the mold.

* * * * *